US008639790B2

(12) United States Patent
Kim et al.

(10) Patent No.: US 8,639,790 B2
(45) Date of Patent: Jan. 28, 2014

(54) NETWORK IMAGE FORMING APPARATUS HAVING AN INFORMATION EXCHANGE FUNCTION AMONG USERS AND METHOD OF CONTROLLING AN OPERATION THEREOF

(75) Inventors: Duk-yong Kim, Suwon-si (KR); Byoung-yue Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 60 days.

(21) Appl. No.: 12/385,676

(22) Filed: Apr. 15, 2009

(65) Prior Publication Data

US 2009/0228803 A1 Sep. 10, 2009

Related U.S. Application Data

(63) Continuation of application No. 10/952,785, filed on Sep. 30, 2004, now abandoned.

(30) Foreign Application Priority Data

Oct. 1, 2003 (KR) .................................. 2003-68209
Sep. 23, 2004 (KR) .................................. 2004-76199

(51) Int. Cl.
*G06F 15/16* (2006.01)
*G06F 15/173* (2006.01)

(52) U.S. Cl.
USPC ............ 709/223; 709/217; 709/224; 709/225

(58) Field of Classification Search
USPC ........................... 709/217, 223, 224; 715/733
See application file for complete search history.

(56) References Cited

U.S. PATENT DOCUMENTS

| | | | |
|---|---|---|---|
| 6,622,266 B1 * | 9/2003 | Goddard et al. ................ | 714/44 |
| 6,985,241 B1 * | 1/2006 | Haines et al. ................. | 358/1.14 |
| 7,161,694 B2 * | 1/2007 | Saka et al. .................... | 358/1.13 |
| 7,290,044 B2 * | 10/2007 | Yuki ............................. | 709/223 |
| 7,962,852 B2 * | 6/2011 | Tagami et al. ................ | 715/733 |
| 2002/0041388 A1 * | 4/2002 | Aoki ............................ | 358/1.14 |
| 2002/0080173 A1 * | 6/2002 | Tagami et al. ................ | 345/753 |
| 2002/0087636 A1 * | 7/2002 | Matsuda et al. .............. | 709/205 |

* cited by examiner

*Primary Examiner* — Umar Cheema
(74) *Attorney, Agent, or Firm* — Roylance, Abrams, Berdo & Goodman, L.L.P.

(57) ABSTRACT

A network image forming apparatus and method that facilitate an information exchange among users on a network. The network image forming apparatus and method are connected to a plurality of user terminals on a network and print data transmitted from the plurality of user terminals. The network image forming apparatus and method include an interface unit for transmitting and receiving specified data to and from the user terminals, and a storage unit for storing shared information if the shared information on the network is transmitted from one of the user terminals. Accordingly, the network image forming apparatus and method provide an announcement function for sharing information among a plurality of user terminals on the network, and the message function enabling the message transfer between the plurality of the user terminals on the network.

17 Claims, 11 Drawing Sheets

NETWORK IMAGE FORMING APPARATUS HAVING AN INFORMATION EXCHANGE FUNCTION AMONG USERS AND METHOD OF CONTROLLING AN OPERATION THEREOF

CROSS-REFERENCE TO RELATED APPLICATION

This is a continuation of U.S. Non-Provisional application Ser. No. 10/952,785, filed on Sep. 30, 2004 now abandoned at the U.S. Patent and Trademark Office, which claims priority under 35 U.S.C. §119(a) from Korean Patent Application No. 2003-68209, filed on Oct. 1, 2003, and Korean Patent Application No. 2004-76199, filed on Sep. 23, 2004, the entire contents of said applications being incorporated herein by reference.

BACKGROUND OF THE INVENTION

1. Field of the Invention

The present invention relates to a network image forming apparatus connected to a plurality of user terminals on a network and a method of controlling an operation thereof.

2. Description of the Related Art

A network printer system refers to a network system in which a printer, that is, a printer server, and a plurality of computers are connected together through a Local Area Network (LAN). When the plurality of computers transmit print data to the printer server, the printer server spools and successively transmits the print data to the printer to perform the print job. Since the network system enables many users to share and use the printer, a low-priced office automation system can be implemented, and thus the network printer system is implemented in most offices.

When using the network printer system, users sometimes desire to share information on the current status of the printer and other matters that demand special attention among the users in the network.

For example, the shared information may be announcements such as "Please place used papers into tray 2 only.", "Please take the output prints immediately." And "Use of used paper in poor condition may cause a paper jam. Please pay attention."

To exchange information among printer users in the network, a user, at most, typically attaches an announcement sheet to the printer indicating a problem with the printer. However, other users in the network cannot see the information attached to the printer until they arrive to take their print outs from the printer. Also, it is inefficient to write down information which can be shared on the network.

SUMMARY OF THE INVENTION

The present invention has been developed in order to solve the above problems associated with the conventional arrangement and to have other advantages. An aspect of the present invention is to provide a network image forming apparatus having an announcement function that facilitates an information exchange among users on a network, and a method of controlling an operation of the image forming apparatus.

The foregoing and other aspects and advantages are substantially realized by providing a network image forming apparatus connected to a plurality of user terminals on a network for printing print data transmitted from the plurality of user terminals. The network image forming apparatus includes an interface unit for transmitting and receiving to and from the user terminals, and a storage unit for storing shared information transmitted from one of the user terminals.

The network image forming apparatus further comprises a control unit for transmitting the shared information stored in the storage unit, when an operation start command is received from one of the plurality of user terminals, to the user terminal transmitting the operation start command.

The shared information includes at least one of information data input through the user terminal, identification data of the user terminal, and time data for indicating when the information data was input.

The network image forming device comprises a printer.

The network comprises a local area network (LAN).

Data transmitted and received through the interface unit is at least one of the shared information, the print data, and the operation start command.

In another aspect of the present invention, a method of controlling an operation of a network image forming apparatus connected to a plurality of user terminals on a network for printing print data transmitted from the plurality of user terminals is provided. The method includes the steps of storing shared information transmitted from one of the user terminals, receiving an operation start command from one of the user terminals, and transmitting the stored shared information to the user terminal transmitting the operation start command.

The shared information includes at least one of information data input through the user terminal, identification data of the user terminal, and time data for inputting the information data.

The network image forming device comprises a printer.

The network comprises a local area network (LAN).

In still another aspect of the present invention, a network system connecting a plurality of user terminals to an image forming apparatus for printing print data transmitted from the plurality of user terminals is provided. The network system includes the plurality of user terminals for transmitting the shared information on the network to the image forming apparatus, the image forming apparatus stores the shared information transmitted from one of the user terminals. If an operation start command is transmitted from one of the user terminals, the image forming apparatus transmits the stored shared information to the user terminal transmitting the operation start command.

The user terminal includes a first interface unit for transmitting and receiving the shared information to and from the image forming apparatus, a setting view generation unit for generating an announcement view for displaying and recording the shared information, and a first control unit for controlling the setting view generation unit to generate the announcement view corresponding to the shared information if the shared information is received.

Preferably, if specified information data is recorded on the announcement view, the first control unit controls the first interface unit to transmit the information data, the identification data, and the time data to the image forming apparatus.

The image forming apparatus includes a second interface unit for transmitting and receiving the shared information to and from the user terminal, a storage unit for storing the shared information transmitted from the user terminal through the second interface unit, and a second control unit for controlling the second interface unit to transmit the shared information stored in the storage unit to the user terminal transmitting the operation start command if the operation start command is received from one of the user terminals.

The shared information includes at least one of information data recorded by the user terminal, identification data of the user terminal, and time data for indicating when the information data was input.

The network image forming device comprises a printer.

The network comprises a local area network (LAN).

In still another aspect of the present invention, a method of controlling an operation of a network system connecting a plurality user terminals and an image forming apparatus for printing print data transmitted to the plurality of user terminals is provided. The method includes the steps of (a) transmitting shared information on a network input of the user terminal to the image forming apparatus, and (b) the image forming apparatus transmitting the pre-stored shared information to the user terminal and transmitting an operation start command if the operation start command is transmitted from one of the user terminals.

The (a) step includes the steps of generating and displaying an announcement view for displaying and recording the shared information, recording specified information data using the announcement view, detecting identification of the user terminal and time data for recording the information data, and transmitting the information data, the identification data and the time data to the image forming apparatus.

The (b) step includes the step of storing the shared information transmitted from one of the user terminals. If the operation start command is transmitted from one of the user terminals, the image forming apparatus transmits the stored shared information to the user terminal transmitting the operation start command.

The shared information includes at least one of information data recorded by the user terminal, identification data of the user terminal, and time data for indicating when the information data was input.

The network image forming device comprises a printer.

In yet another aspect of the present invention, a method of controlling an operation of a network system comprising a plurality of user terminals including first and second terminals and an image forming apparatus for printing print data transmitted from the plurality of the user terminals, comprises the steps of (a) generating a user list relating to information on users of the user terminals, and (b) selecting a particular user from the generated user list and transmitting a message input from the first terminal to the second terminal used by the selected particular user.

The (a) step comprising the steps of transmitting from the first terminal to the second terminal a command requesting the user list including information on the image forming apparatus, determining whether there is a response to the command from the second terminal, and storing information on the user of the second terminal in the first terminal if there is the response to the command.

The (a) step further comprises the steps of determining whether the first terminal receives a command requesting the user list including the information on the image forming apparatus if there is no response to the command, determining whether the information on the image forming apparatus included in the command requesting the user list is identical to information on an image forming apparatus used by the first terminal if the command requesting the user list is received, and transmitting information on the user of the first terminal to a user terminal transmitting the command requesting the user list if the information on the image forming apparatus are identical.

The information on the image forming apparatus is one of an identification data of the image forming apparatus and an information provider (IP) address. The information on the users is at least one of names of the users and IP addresses of the user terminals.

The (b) step comprises the steps of detecting an IP address of the particular user from among the information on the users, and transmitting the message to the detected IP address.

A network system comprising a plurality of user terminals and an image forming apparatus for printing print data transmitted from the plurality of the user terminals, the network system comprises the plurality of the user terminals for transmitting a message between users of the user terminals by using information on the users of the user terminals.

The user terminals respectively comprises a second interface unit for transmitting and receiving the message between the user terminals, a first setting view generation unit for generating a user-to-user message service view to indicate and record the message and displaying the information on the users, and a second control unit for generating a user list by use of the information on the users and controlling the first setting view generation unit to generate the user-to-user message service view corresponding to the message if the message is received.

The information on the users comprises at least one of names of the user and information provider (IP) addresses of the user terminals.

BRIEF DESCRIPTION OF THE DRAWINGS

The above aspects and features of the present invention will be more apparent by describing certain embodiments of the present invention with reference to the accompanying drawing figures, in which.

It should be understood that in the drawings, like reference numbers refer to like features and structures.

DETAILED DESCRIPTION OF EXEMPLARY EMBODIMENTS

Certain embodiments of the present invention will now be described in detail with reference to the accompanying drawing figures.

The matters defined in the description such as a detailed construction and elements are used as examples. Thus, it should be apparent to those skilled in the art that the present invention can be performed without being limited to the examples shown. Also, well-known functions or constructions are omitted for conciseness.

Figure 1:
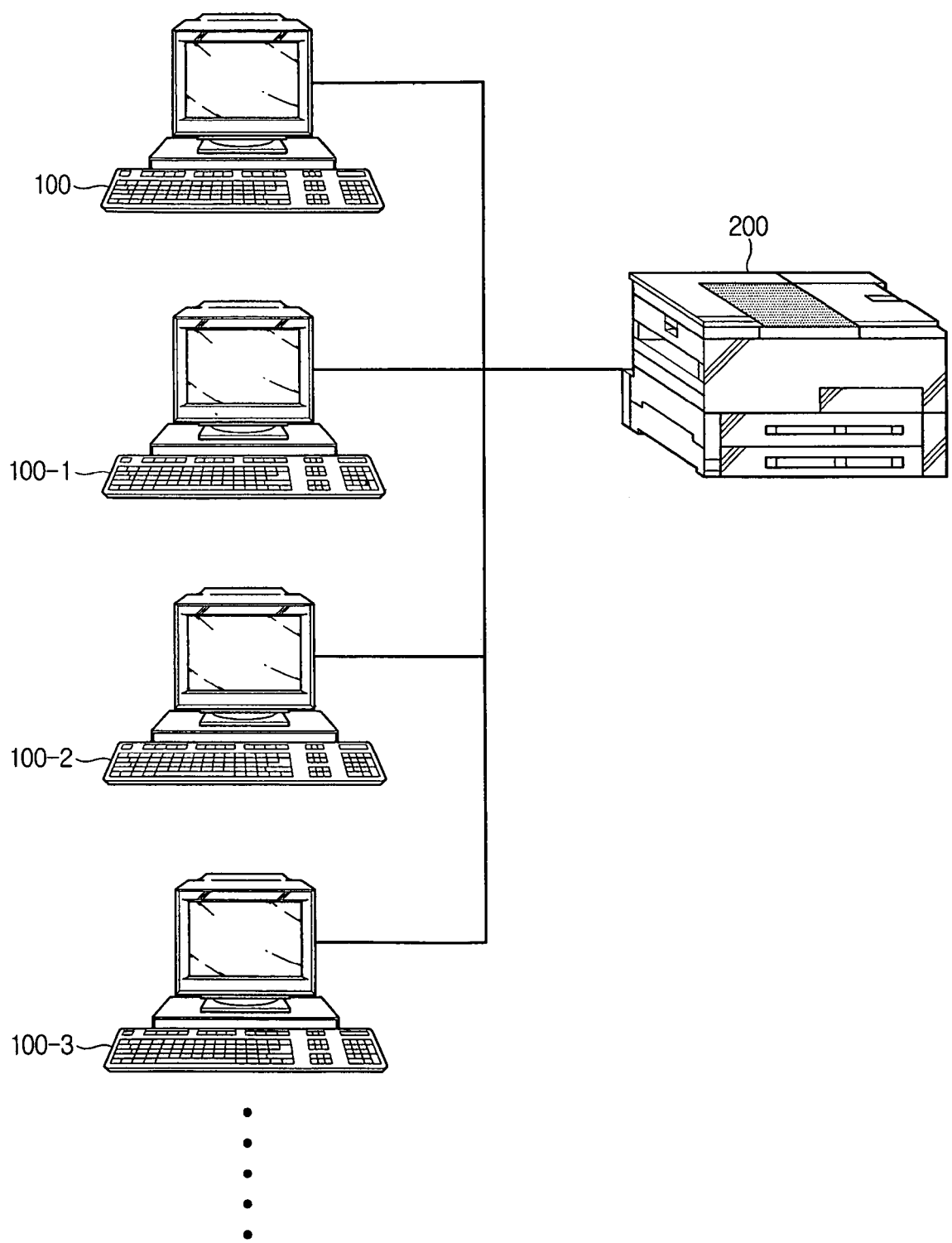
FIG. 1 is a diagram illustrating the construction of a network system having a network printer according to an embodiment of the present invention.

FIG. 1 is a diagram illustrating the construction of a network system having a network printer according to an embodiment of the present invention.

Referring to FIG. 1, the network system includes a network printer 200 and a plurality of user terminals 100, 100-1, 100-2, and so on, which are user interfaces (UI) connected to the network printer 200 through a Local Area Network (LAN). The network printer 200 prints print data transmitted in real time from the plurality of user terminals 100, 100-1, 100-2, and so on, in relation to the order of transmission.

The network system having the network printer according to an embodiment of the present invention has an announcement function that facilitates the information exchange among users of the user terminals connected on the network. If a print start command is transmitted from one user terminal 100 of the plurality of user terminals 100, 100-1, 100-2, and so on, to the network printer 200, the network printer 200 transmits shared information pre-stored on the network to the user terminal 100. A printer driver in the user terminal 100 generates and displays a specified announcement view to the users in relation to the transmitted shared information.

Accordingly, the user of the user terminal 100 can recognize the current information shared on the network, for example, the shared information such as matters that demand special attention and other official announcements, when the user uses the network printer 200.

The user of the user terminal 100 can input information subject to official announcement to other users on the network through an announcement view. The shared information input through the user terminal 100 is transmitted to and stored in the network printer 200 in relation to a specified control signal.

Accordingly, the users of the network system according to an embodiment of the present invention can recognize the pre-stored shared information when they use the network printer 200.

Figure 2:
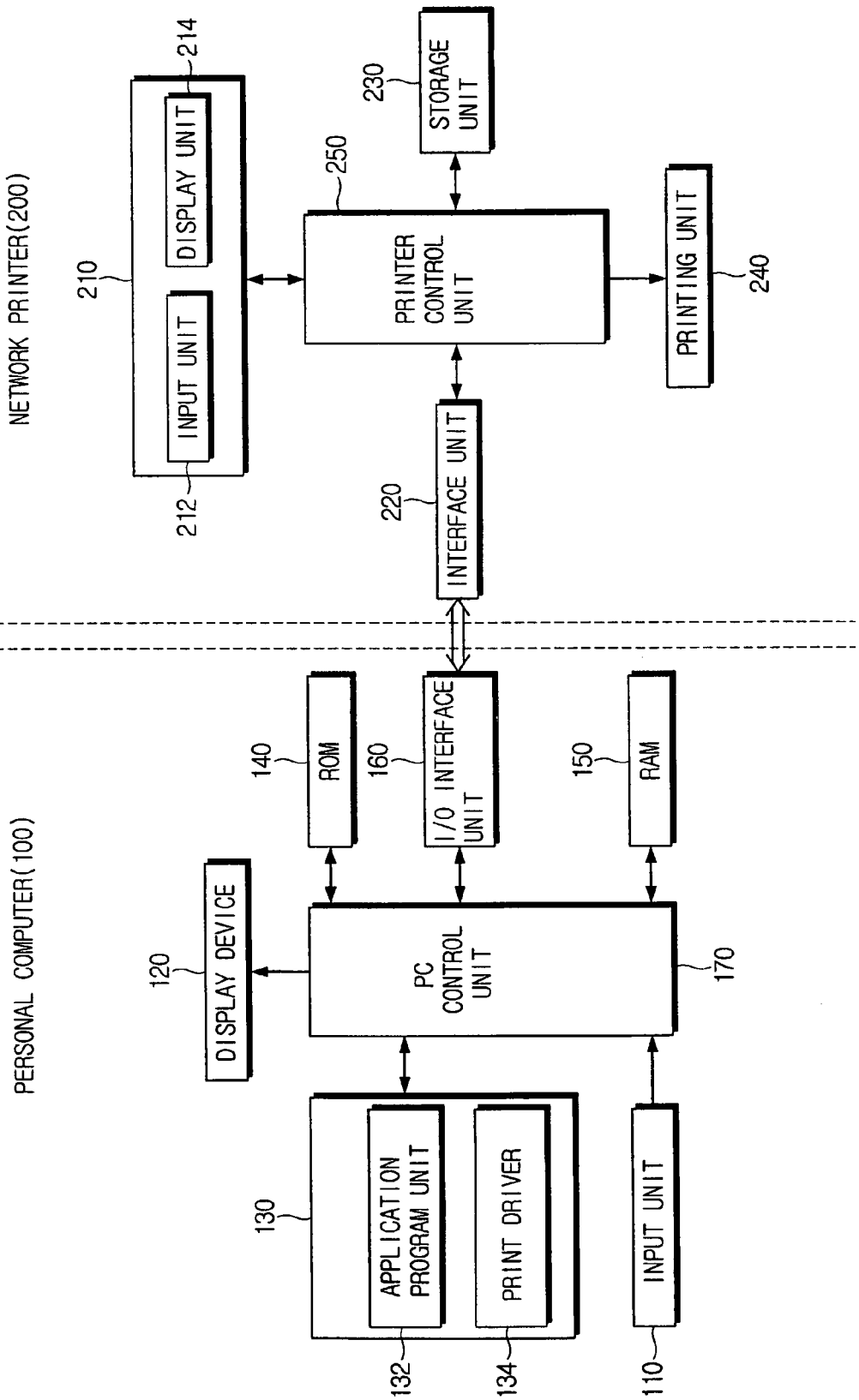
FIG. 2 is a block diagram illustrating the construction of a PC and a network computer in the network printer system of FIG. 1.

FIG. 2 is a block diagram illustrating the construction of an example of the network image forming apparatus according to an embodiment of the present invention, showing a personal computer (PC) 100 and a network printer 200 connected to the PC 100.

Referring to FIG. 2, the network system includes the PC 100 and the network printer 200.

The PC 100 is provided with an input device 110, a display device 120, a storage device 130, a read only memory (ROM) 140, a random access memory (RAM) 150, an input/output (I/O) interface unit 160, and a PC control unit 170.

The input device 110 is a general input device such as a keyboard and mouse, and receives an input based on a user's manipulation command.

The display device 120 is typically a monitor, and displays the operating state of the PC 100 to the users.

The storage device 130 has an application program unit 132 and a printer driver 134.

The application program unit 132 is provided with application programs for preparing various kinds of documents, and the printer driver 134 generates a basic setting view that includes an environment setting view for reflecting the user's environment setting request with respect to the connected network printer 200, an announcement view for displaying and recording the shared information for the information exchange on the network, and an message view for transmitting and receiving a user list relating to information on a user of the network printer 200 and messages to and from other users.

If new input information data is input on the announcement view, the printer driver 134 detects identification data (ID) like an ID of the PC 100 and time data for inputting the information data. The identification data and the time data detected as described above are transmitted to the network printer 200 along with the input information data.

With respect to the basic setting view generated by the printer driver 134, a detailed explanation will now be provided.

The ROM 140 is a non-volatile memory device that stores various kinds of control programs required to implement the function of the PC 100.

The RAM 150 is a volatile memory device that temporarily stores data when the PC control unit 170 performs the programs.

The I/O interface unit 160 is provided to be connectable to the network printer 200, and performs mutual data communication between the network printer 200 and the PC 100. The I/O interface unit 160 performs mutual data communication between other PCs which use the same network printer 200.

For example, the I/O interface unit 160 transmits the shared information input through the announcement view to the network printer 200, or receives the shared information transmitted from the network printer 200. The message view transfers the input message or receives message to and from other PC users.

The PC control unit 170 controls the overall operation of the PC 100 according to the programs stored in the ROM 140, and generates the user list relating to the information on users of the PC 100.

For example, if the print start command is input through the input device 100 in order to print the document prepared by the specified application program, the PC control unit 170 receives the environment setting information and the shared information transmitted from the network printer 200 by controlling the I/O interface unit 160. The PC controller 170 controls the I/O interface unit 160 to receive the messages transmitted from other PCs.

The PC control unit 170 controls the printer driver 134 to generate the environment setting view and the announcement view for displaying the received environment setting information and the shared information on the display device 120. If new environment setting information and shared information are input through the environment setting view and the announcement view, the PC control unit 170 transmits the new environment setting information and shared information to the network printer 200.

The PC controller 170 generates the message view for displaying messages received from other PCs on the display device 120 by controlling the printer driver 134. When a message is input on the generated message view and a particular user for whom the message is destined selected from the generated user list, the input message is transmitted to the PC of the particular user.

The network printer 200 has an operating panel 210, an interface unit 220, a storage unit 230, a print unit 240, and a printer control unit 250.

The interface unit 220 is connected to the I/O interface unit 160 of the PC 100, and receives and transmits specified data from and to the PC 100.

The operating panel 210 is provided with an input unit 212 and a display unit 214.

The input unit 212 has a plurality of function keys for setting various kinds of functions supported by the network printer 200. The display unit 214 is a display device such as a liquid crystal display (LCD) that displays the current operating state of the network printer 200.

The storage unit 230 stores various kinds of control programs required to implement the function of the network printer 200, data generated during the operation of the network printer 200, and information on the data.

Also, the storage unit 230 stores the shared information transmitted from the PC 100 on the network. Accordingly, if the print start command is received from the PC 100, the shared information pre-stored in the storage unit 230 is transmitted to the PC 100 that transmitted the print start command.

The shared information stored in the storage unit 230 includes information data input by the PC 100, identification data of the PC 100, and time data for inputting the information data.

The print unit 240 performs a print function for the print data transmitted from the plurality of PCs on the network.

The printer control unit 250 controls the overall operation of the network printer 200.

For example, if the operation start command is transmitted from a certain PC, the printer control unit 250 controls the interface unit 220 to transmit the set information on the operational environment of the network printer 200 and the shared information pre-stored in the storage unit 230 to the corresponding PC. Also, if the shared information is received from the plurality of PCs, the printer control unit 250 stores the received shared information in the storage unit 230.

Hereinafter, the process for an announcement function for an information exchange on the network performed by the network printer according to an embodiment of the present invention will now be explained in detail with reference to the accompanying drawing figures.

FIGS. 3A through 3D are examples of the environment setting view and the announcement view generated by the printer driver 134 of the network printer according to an embodiment of the present invention. FIG. 4 is a flowchart illustrating a process for an announcement board function performed by the network printer according to an embodiment of the present invention.

The user of the PC 100 among the plurality of PCs on the network prepares a specified document, and then selects the print start command in order to print the prepared document. It is assumed that the ID of the PC 100 is 135.05.13.35.

Specifically, the user selects an icon corresponding to the print start command from a selection menu of a document preparation program indicated on the display device 120 of the PC 100 through the input device 110, for example, a mouse.

If the print start command is selected, the PC control unit 170 transmits the print start command to the interface unit 220 of the network printer 200 by controlling the I/O interface unit 160 at step S411.

If the print start command is transmitted, the printer control unit 250 transmits the environment setting information on the current operational environment of the printer and the shared information stored in the storage unit 230 to the I/O interface unit 160 of the PC 100 through the interface unit 220 at step S413.

The PC control unit 170 provides the transmitted environment setting information and the shared information to the printer driver 134, and the printer driver 134 generates a basic setting view based on the environment setting information and the shared information at step S415.

Figure 3A:
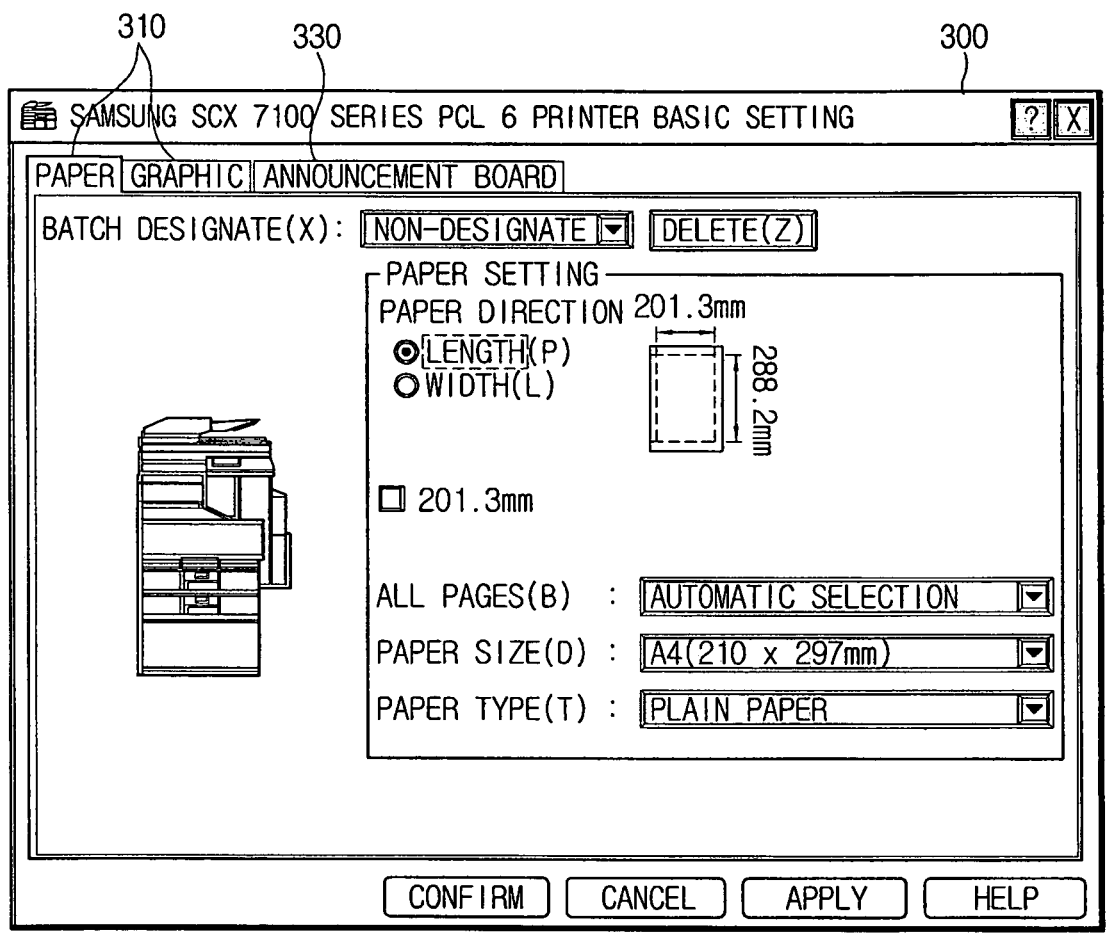
FIGS. 3A through 3D are diagrams illustrating examples of basic settings generated in a printer driver by the setting view generation unit in order to explain the process of performing an announcement function according to an embodiment of the present invention.
Figure 4:
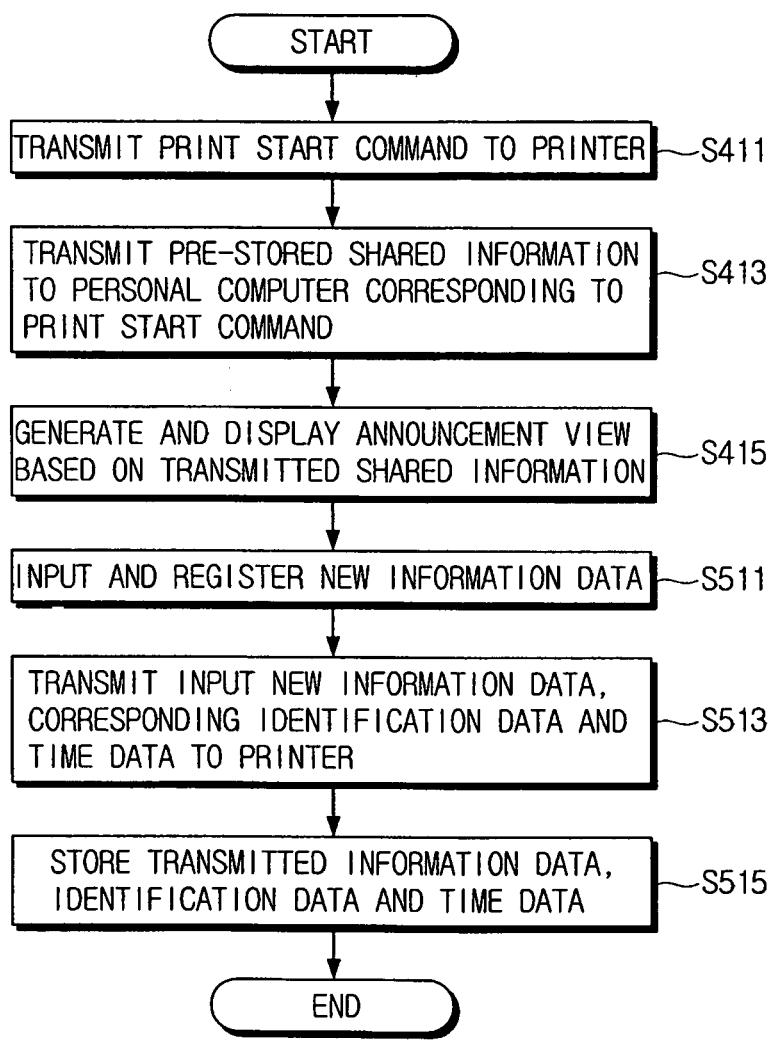
FIG. 4 is a flowchart illustrating a process for an announcement board function performed by the network printer system according to an embodiment of the present invention.

FIG. 3A illustrates a basic setting view 300 generated by the printer driver 134. As shown in FIG. 3A, the basic setting view 300 has an environment setting view 310 and an announcement view 330 corresponding to the environment setting information and the shared information.

If an item "Paper" is selected, information settings for the printing paper is displayed on the network printer 200, and the user may change the setting information.

Figure 3B:
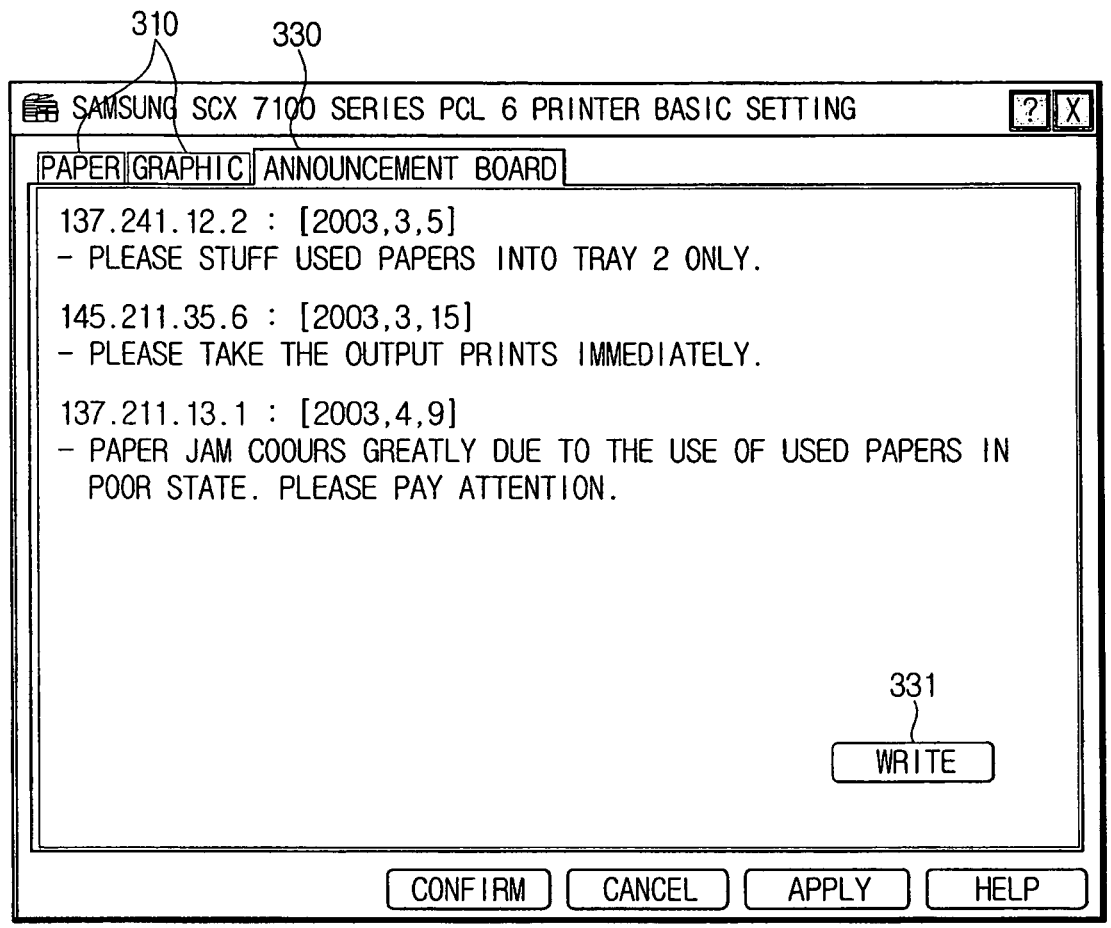

If an item "Announcement Board", that is, the announcement view 330, is selected on the basic setting view 300, as shown in FIG. 3B, the shared information on the network pre-stored in the storage unit 230 is displayed to users through the announcement view 330.

Specifically, the announcement view 330 displays information data for announcing "Please stuff used papers into tray 2 only" that was input from a PC (ID: 137.241.12.2) on Mar. 5, 2003. In the same manner, information data input from the PC (ID: 145.211.35.6) and information data input from the PC (ID: 137.211.13.1) are respectively displayed on the announcement view 330.

Accordingly, the user of the PC 100 can view the shared information on the network such as usage information for the network printer 200 and other matters that demand special attention, displayed on the announcement view 330.

In order for the user of the PC 100 to register recently shared information on the announcement view 300, the following process should be performed.

An icon 331 "Write" is provided on the announcement view 300 for inputting new information data in addition to the shared information on the network. Thus, the user of the PC 100 can input new information data by selecting the icon 331 "Write".

Figure 3C:
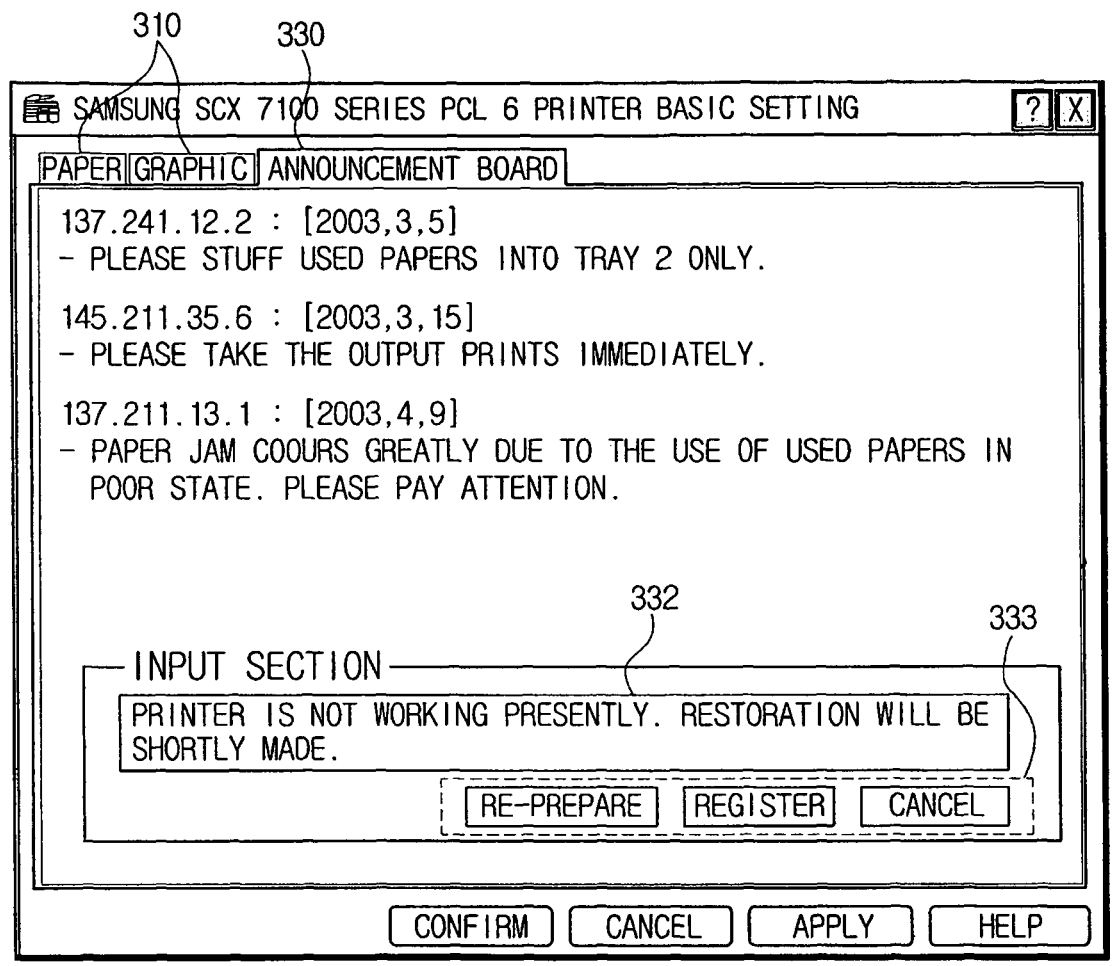

If the icon 331 "Write" is selected, as shown in FIG. 3C, an input section 332 for inputting the information data, and icons 333 for determining whether to register the input information data, for example, "Re-prepare", "Register", and "Cancel", are displayed.

Figure 3D:
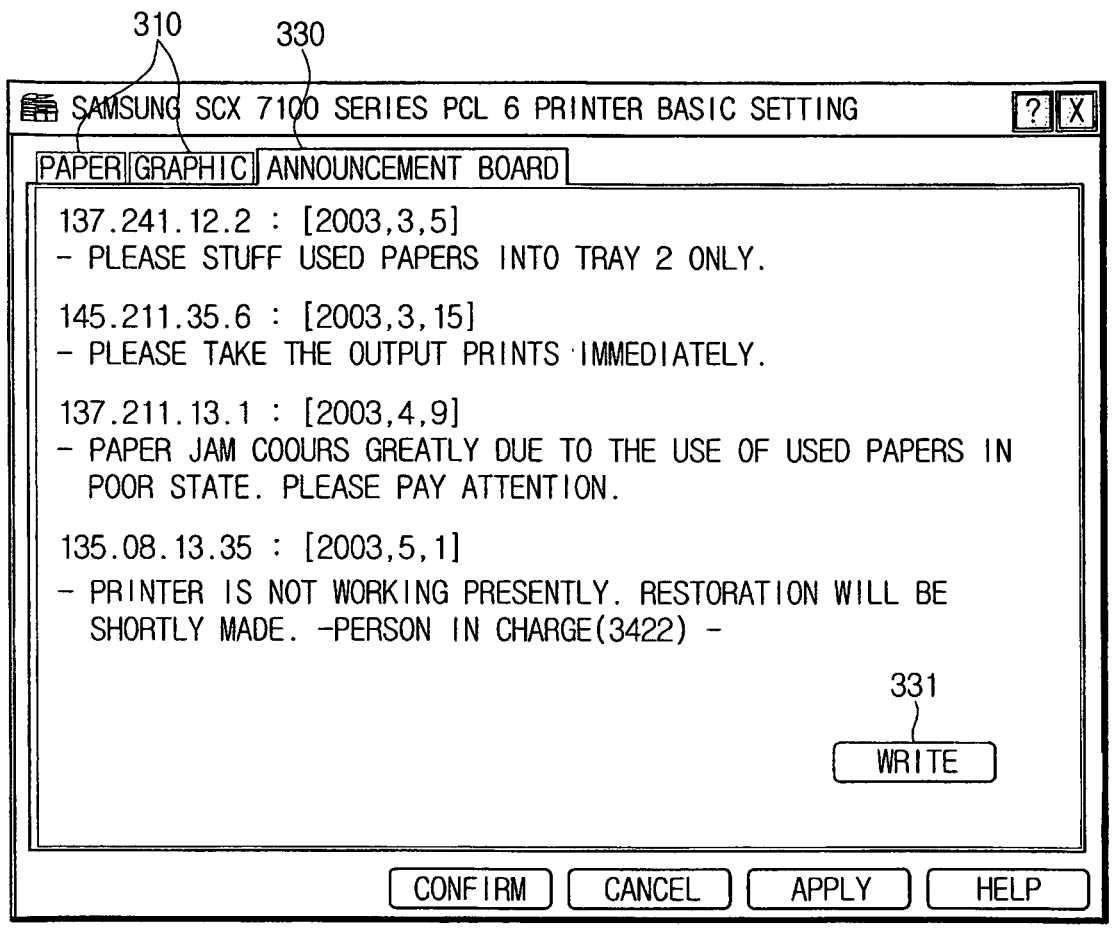

If the user inputs specific information data, for example, as illustrated, "Printer is not working presently. Restoration will be shortly made. Person in charge (3422)", and then selects the icon "Register" among the icons 333, the new information data input on the input section 332 is displayed on the announcement view 330 as shown in FIG. 3D at step S511.

At this time, on the announcement view 330, the input information data, the ID (for example, 135.08.13.35) of the PC that inputs the information data, and the time (for example, May 1, 2003) when the information data was input are simultaneously displayed.

Next, if the basic setting view 300 is terminated, the environment setting information and the shared information input on the environment setting view 310 and the announcement view 330, respectively, are transmitted to the interface unit 220 of the network printer 200 through the I/O interface unit 160 of the PC 100 at step S513.

The printer control unit 250 resets the operating state of the network printer 200 based on the transmitted environment setting information, and stores the transmitted shared information in the storage unit 230 at step S515.

Specifically, the shared information stored in the storage unit 230 includes the information data input on the PC 100, the ID of the PC that input the information data, and the time data when the information data was input at step S515.

Next, if the print start command is transmitted from the PC on the network, the printer control unit 250 transmits the shared information (such as information data, identification data, and time data) stored in the storage unit 230 to the PC.

The PC, which is the user terminal, displays the information currently shared on the network to the users on the network, and thus the user can view the shared information on the network.

Accordingly, the information on the use of the printer in the network can be easily exchanged among the users, and thus the use efficiency and convenience of the network printer can be improved.

Also, it should be understood that, by using the network printer as described above, diverse information can be exchanged on the network. In addition, the information on the network printer can be exchanged among the users.

Figure 5:
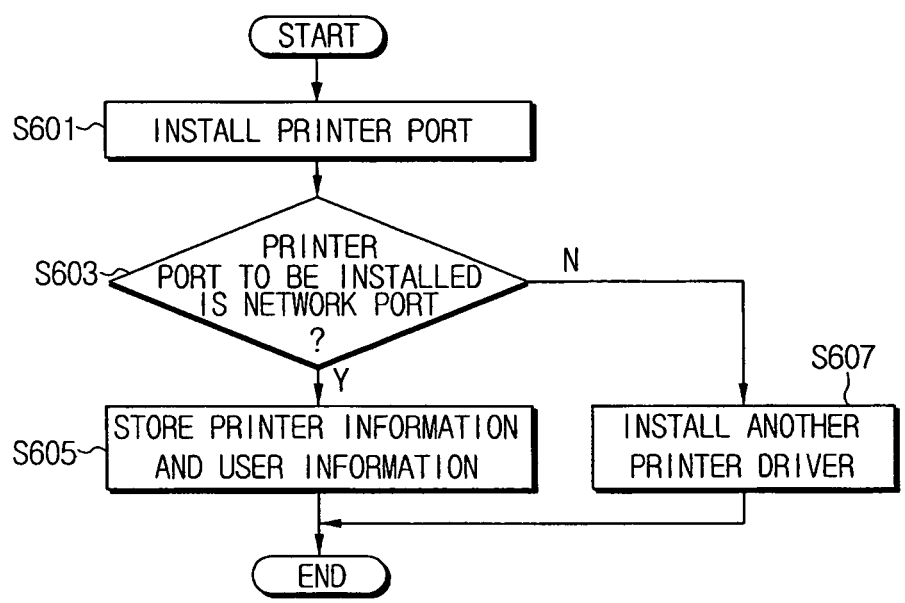
FIG. 5 is a flowchart illustrating a process for installing in a PC the printer driver for a message service between users in the network printer system according to an embodiment of the present invention.

FIG. 5 is a flowchart illustrating a process of installing the printer driver 134 in the PC for the instance message service between users in the network system according to an embodiment of the present invention. The network system according to an embodiment of the present invention requires the installation of the printer driver 134 which provides the message service between users utilizing the same network printer.

Referring to FIG. 5, a user installs a printer port in the PC 100 at step S601.

Next, it is determined whether the printer port to be installed is a network printer port at step S603. The printer driver to be installed varies depending on the installed printer port.

If the printer port to be installed is the network printer port, printer information and user information are stored in the storage device 130 at step S605. The printer information and a user name of the network printer 200 to be installed are stored in the storage device 130 during the installation of the printer driver 134 which provides the message service to the users using the same network printer 200.

The printer information indicates an address for initiating a network with the network printer 200, for example, an address such as an information provider (IP) address and the identification data for identifying the network printer 200. The printer identification data can be a product number assigned to each printer or a media access control (MAC) address of a network card. The user name may be input by the user during the installation of the printer driver 134 or use a Window log-in name of the user.

If the printer port to be installed is not the network printer port, another printer driver is installed instead of the printer driver 134, providing the message service to the users using the same printer at step S607.

Figure 6:
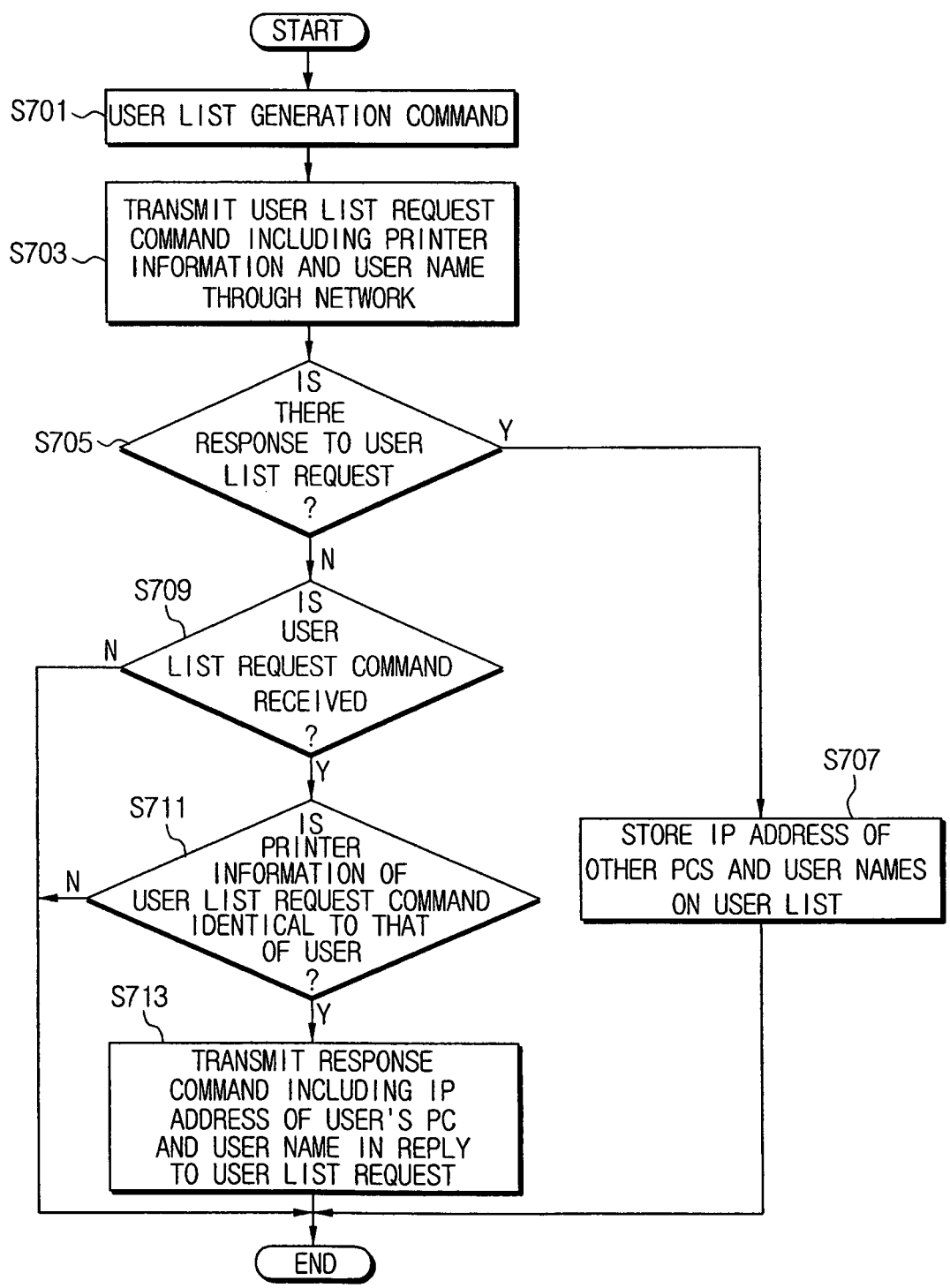
FIG. 6 is a flowchart of a process for generating a user list used for the message service between the users in the network system according to an embodiment of the present invention.

FIG. 6 is a flowchart of a process for generating the user list used for the message service between the users in the network system according to an embodiment of the present invention. The generated user list is used when a user prepares a message to be transmitted to other users, selects a particular user among the users on the user list, and transfers the message to the particular user.

Referring to FIG. 6, the user inputs a command for generating the user list of the users using the same network printer 200 at step S701. The user generates the user list by use of the input device 110. The user list provides names of other users using the same network printer 200 and IP addresses of PCs of the other users. Using an instance message menu of a printer driver menu providing the instant message service between the users, the user selects a specific user on the user list and transfers the message to the specific user.

According to the command input for generating the user list, a user list request command including the printer information and the user name is transmitted to the other users through the network at step S703. The user list generation command input is sent to the PC control unit 170. The PC control unit 170 controls the storage device 130 and the I/O interface unit 160 to deliver the user list request command including the printer information and the user name stored in the storage device 130 to the PC users utilizing the same network printer 200 through the I/O interface unit 160.

It is determined whether there is a response to the user list request command transmitted to the other PC users at step S705.

If so, the IP addresses of the other PCs and the user names received from the other PC users are stored on the user list at step S707. Specifically, when the other PC users respond to the received user list request command and transmit the IP address of their PCs and the user names to the user transmitted the user list request command, the IP addresses of the other PCs and the user names are received and stored.

In contrast, if there is no response to the user list request command, it is determined whether the user list request command is received at the PC that transmitted the user list request command at step S709.

If the user list request command is received, it is determined whether the printer information contained in the received user list request command is identical to the received printer information of the user at step S711. That is, it is determined whether the PC transmitting the user list request command and the PC receiving the user list request command utilize the same network printer 200.

The received user list request command includes the printer information and the user name. Thus, the printer information such as the printer identification data, which is received from the PC transmitting the user list request command, is analyzed and compared with the received printer information of the PC and thus, it is determined whether they utilize the same network printer 200.

When the printer information contained in the received user list request command is identical to that of the PC that received the user list request command according to the comparison, a response command including the IP address of the PC that received the user list request command and the user name is transmitted in response to the user list request at step S713.

The generation of the user list is terminated when there is no response to the user list request at step S709 and the PC does not receive the user list request command and when the user list request command is received at the PC at step S711 but the printer information in the received user list request command is different from the received printer information of the PC.

Figure 7A:
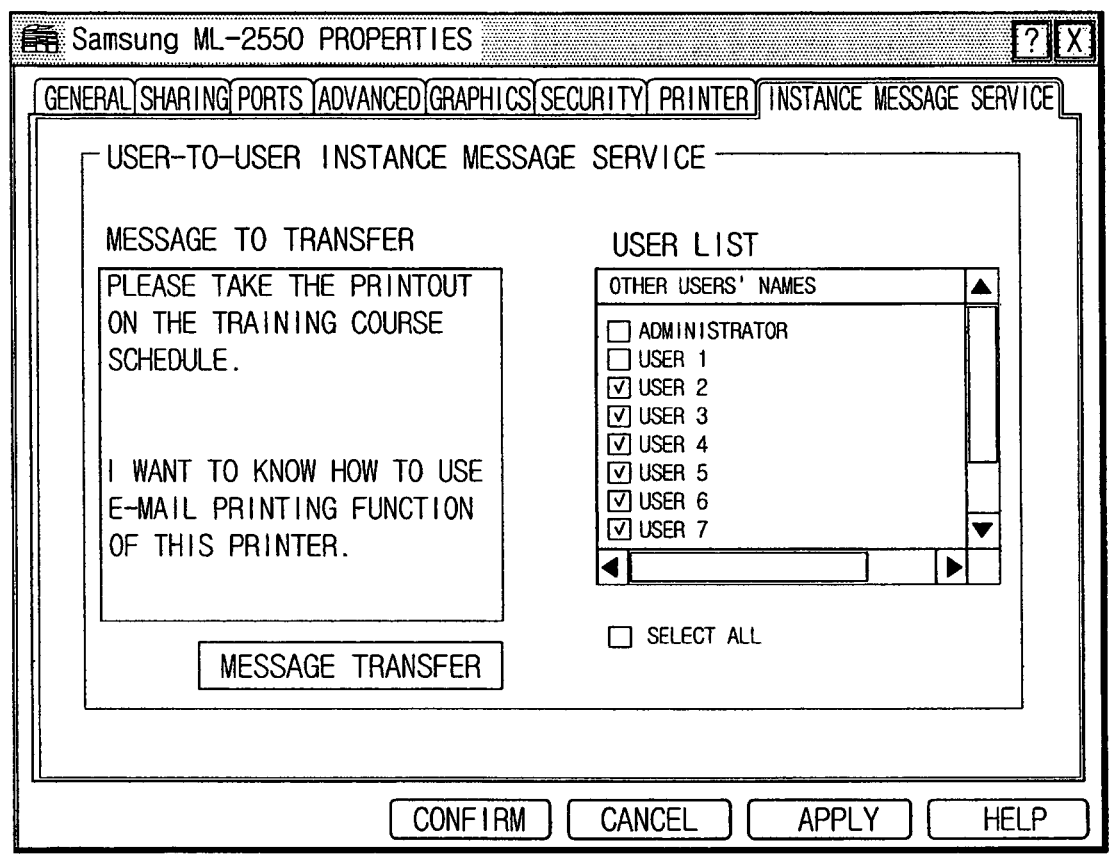
FIGS. 7A and 7B are views illustrating a message is transmitted and received between the users in the network printer system according to an embodiment of the present invention.
Figure 7B:
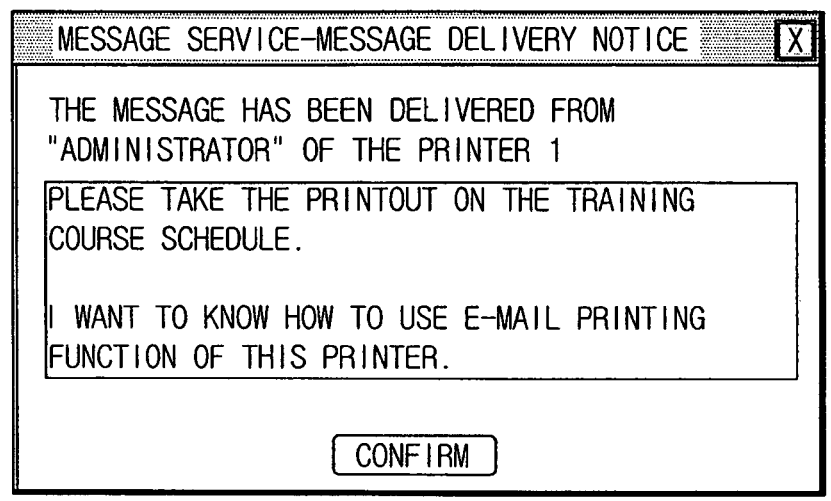

FIGS. 7A and 7B are views illustrating messages that are transmitted and received between the users in the network printer system according to an embodiment of the present invention.

FIG. 7A illustrates a user transmitting a message to other users using the message service menu of the printer driver 134. FIG. 7B illustrates the message being received by other users by use of the message service menu of the printer driver 134.

Referring to FIG. 7A, the user of the PC 100 connected to the network printer 200 can transmit the message to other PC users by use of the message service menu of the printer driver 134 providing the message service.

The user of the PC 100 selects user names for which the message is destined on the user list displayed on the display device 120, inputs the contents of the message to be transmitted in an input section, selects a message transfer button, and thus, the message is transmitted. The user names for which the message is destined may be all the user names on the user list by selecting a 'select all' menu, or, specific user names. When the user selects the message transfer button after inputting the message content and selecting the user names, the input message is transmitted to IP addresses of the PCs corresponding to the user names selected on the user list.

Referring now to FIG. 7B, when another user of the PC connected to the network printer 200 transmits a message using the message service of the printer driver 134, the message is displayed on the display device 120 so that the user can receive the message.

As described, the network image forming apparatus according to an embodiment of the present invention provides an announcement function for sharing information among a plurality of user terminals in the network.

Accordingly, information required to use the network image forming apparatus, and warning information are announced to a plurality of users who manipulate a plurality of user terminals, and thus the use and convenience of the network image forming apparatus can be improved. In addition to the information on the use of the network image forming apparatus, it should be understood that the announcement function itself can be used for information exchange and announcement among the users on the network.

The network image forming apparatus provides the message function enabling the message transfer between a plurality of user terminals in the network.

Accordingly, information on the network image forming apparatus is provided in real-time to particular users operating the user terminals.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. An image forming apparatus, connectable to a plurality of user terminals on a network, the image forming apparatus comprising:
   an interface that facilitates information exchange among the user terminals connected via the network, the interface configured to receive shared information from one of the user terminals to be shared with the other user terminals; and
   a storage member configured to store the shared information;
   wherein the interface allows a user to write input information data to an announcement view shared with the other user terminals on the network;
   wherein the interface transmits the shared information, when a request for accessing the shared information is received from another one of the plurality of user terminals, to the user terminal transmitting the request, and the shared information is used to announce an instruction created by a user and transmitted to other users via the user terminals; and
   wherein the interface includes a message view, which allows a user to generate a list of users on the same image forming apparatus and select a specific user from the list of users to instant message.

2. The image forming apparatus according to claim 1, wherein the shared information includes at least one of specified information input by the user terminal, identification data of the user terminal and input time of the specified information.

3. The image forming apparatus according to claim 1, wherein a request for accessing the shared information is generated by a user terminal in response to the announcement view selected via a user interface of the user terminal.

4. The image forming apparatus according to claim 1, wherein the status of the image forming apparatus indicates that the image forming apparatus is currently not working.

5. The image forming apparatus according to claim 1, wherein the shared information is generated by a printer driver of the respective user terminal sending the shared information.

6. The image forming apparatus according to claim 1, wherein the shared information is associated with identification data.

7. The image forming apparatus according to claim 6, wherein the identification data comprises a user terminal identification.

8. The image forming apparatus according to claim 6, wherein the identification data comprises time data for inputting the shared information.

9. A method of controlling an operation of an image forming apparatus, connectable to a plurality of user terminals on a network, comprising the steps of:
   providing a message view, which allows a user to generate a list of users on the same image forming apparatus and select a specific user from the list of users to instant message;
   inputting shared information from one of the user terminals to be shared with the other user terminals, the shared information is used to announce an instruction created by a user and transmitted to other users via the user terminals;
   storing the shared information;
   receiving a request for accessing the shared information from another one of the plurality of user terminals; and
   transmitting the shared information to the user terminal transmitting the request.

10. The method according to claim 9, wherein the shared information includes at least one of specified information input by the user terminal, identification data of the user terminal and input time of the specified information.

11. The method according to claim 9, wherein a request for accessing the shared information is generated by a user terminal in response to the announcement view selected via a user interface of the user terminal.

12. The method according to claim 9, wherein the instruction relating to the image forming apparatus concerns loading a tray of the image forming apparatus.

13. The method according to claim 9, wherein the instruction relating to the image forming apparatus concerns a matter that demands special attention.

14. The method according to claim 9, wherein the shared information is generated by a printer driver of the respective user terminal sending the shared information.

15. The method according to claim 9, wherein the shared information is associated with identification data.

16. The method according to claim 15, wherein the identification data comprises a user terminal identification.

17. The method according to claim 15, wherein the identification data comprises time data for inputting the shared information.

* * * * *